UNITED STATES PATENT OFFICE.

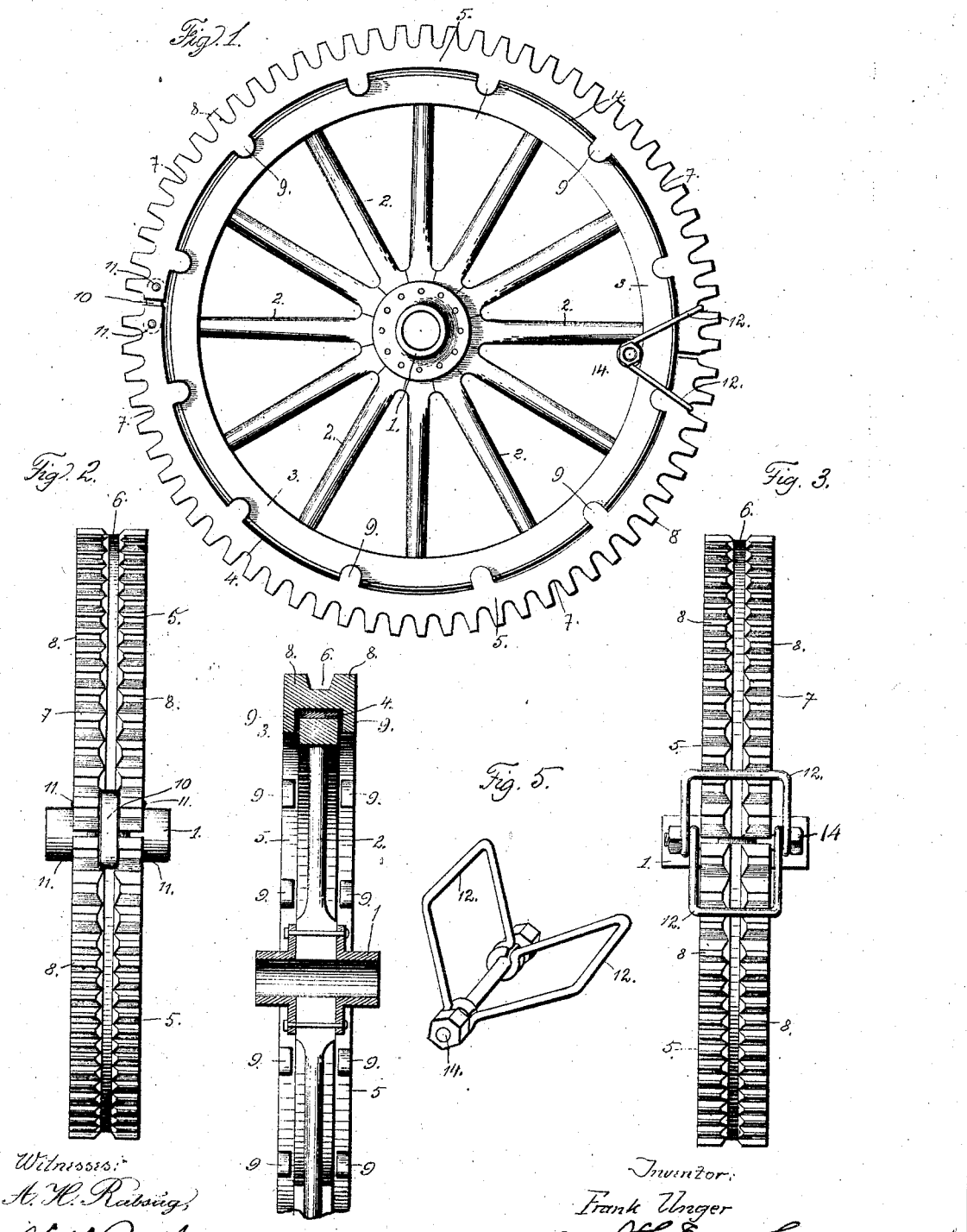

FRANK UNGER, OF RIMERSBURG, PENNSYLVANIA.

ATTACHMENT FOR WHEELS.

No. 846,523.　　　Specification of Letters Patent.　　　Patented March 12, 1907.

Application filed October 2, 1906. Serial No. 337,155.

*To all whom it may concern:*

Be it known that I, FRANK UNGER, a citizen of the United States of America, residing at Rimersburg, in the county of Clarion and State of Pennsylvania, have invented certain new and useful Improvements in Attachments for Wheels, of which the following is a specification, reference being had therein to the accompanying drawing.

This invention relates to certain new and useful improvements in attachments for vehicle-wheels; and the invention has for its object to provide a novel tread adapted to prevent wheels from slipping or sliding over smooth or inclined surfaces.

Another object of my invention is to provide a serrated or toothed tread for wheels and novel means for detachably securing the same to a wheel.

With these and other objects in view, which will more readily appear as the invention is better understood, the same consists in the novel construction, combination, and arrangement of parts to be described and then specifically pointed out in the claims.

Referring to the drawing forming part of this specification, like numerals of reference designate corresponding parts throughout the several views, in which—

Figure 1 is an elevation of a wheel equipped with my attachment. Fig. 2 is an edge view of the same, illustrating a hinge of the attachment. Fig. 3 is a similar view illustrating the fastening means of the attachment. Fig. 4 is a fragmentary sectional view of a wheel and its attachment, and Fig. 5 is a perspective view of a detached clevis used in connection with the attachment.

In the accompanying drawings, I have illustrated a conventional form of wheel embodying a hub 1, spokes 2, a felly 3, and a rim or tire 4. Upon the tire 4 is mounted my improved attachment, which consists of two semicircular sections 5, having central peripheral grooves 6, intersected by transverse grooves 7, thereby forming two rows of peripheral teeth or calks 8. The sections are provided with inwardly-extending radially-disposed lugs 9 upon each side of said sections to embrace the tire 4 and felly 3 of a wheel and prevent said sections from moving laterally upon the tire 4.

To connect the ends of the sections 5 together, I employ a hinge and a double clevis, the hinge comprising a bar 10, pivotally connected to the ends of the sections 5 by pins 11. The double clevis comprises two yokes or straps 12, adapted to engage in two of the transverse grooves 7 of the sections 5, said yokes having their ends connected by a pin or bolt 14 passing under the felly 3 between two of the spokes 2. When clamped upon a wheel, it will be impossible for the attachment to become displaced unless the pins or bolts 11 and 14 are removed.

By the novel construction of my improved attachment the same can be easily and quickly placed upon a wheel, and when not in use the double clevis or yokes 12 and the hinged bar 10 can be removed, whereby the sections 5 can be placed one upon the other and stored in the vehicle in connection with which the same is used.

The teeth or calks 8 of the sections 5 are adapted to engage in the smooth or inclined surface over which the vehicle is traveling and prevent the same from slipping or sliding.

The attachment will be made of light and durable metal and of sizes to fit various types of wheels.

What I claim, and desire to secure by Letters Patent, is—

1. An attachment for wheels of the character described, consisting of two hinged semicircular sections having central peripheral grooves formed therein intersected by transverse grooves to form two rows of peripheral teeth, inwardly-extending lugs carried by said sections, and a double clevis adapted to connect the free ends of said sections together, substantially as described.

2. An attachment for wheels, comprising two semicircular sections hinged together at one end and having peripheral teeth, and means engaging the sections at their free ends to bind them upon a wheel, and comprising a double clevis one part engaging one section and the other part engaging the other section, said parts of the clevis spanning the wheel-rim, and a single bolt securing both parts of the clevis to the sections and wheel-rim.

In testimony whereof I affix my signature in the presence of two witnesses.

FRANK UNGER.

Witnesses:
I. L. JONES,
F. GRUEBELE.